July 26, 1927.
C. T. WESTLAKE
1,636,843
BOOSTER MOTOR SUPPORT
Filed July 17, 1924
2 Sheets-Sheet 1
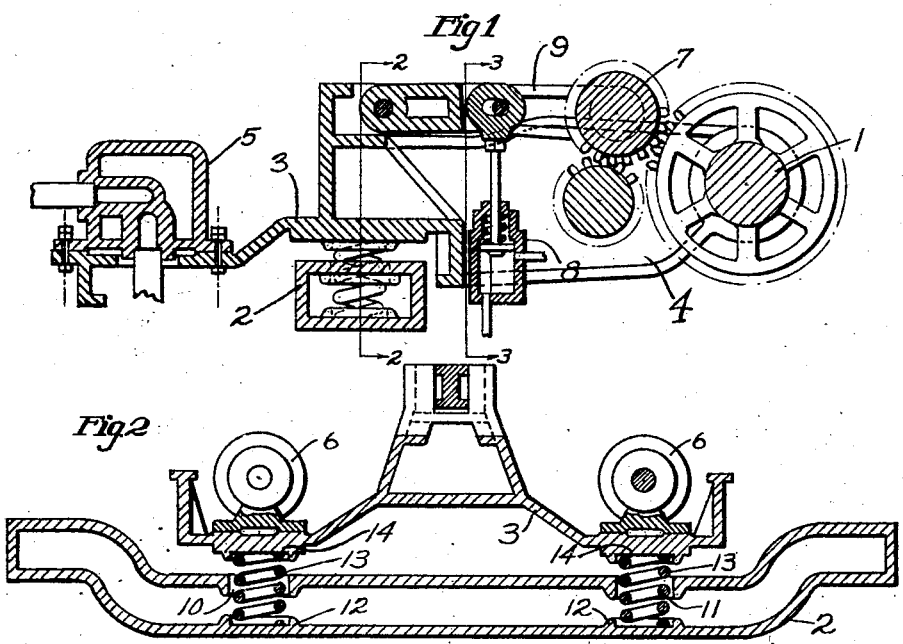
Inventor
Charles T. Westlake July 26, 1927.
C. T. WESTLAKE
1,636,843
BOOSTER MOTOR SUPPORT
Filed July 17, 1924
2 Sheets-Sheet 2
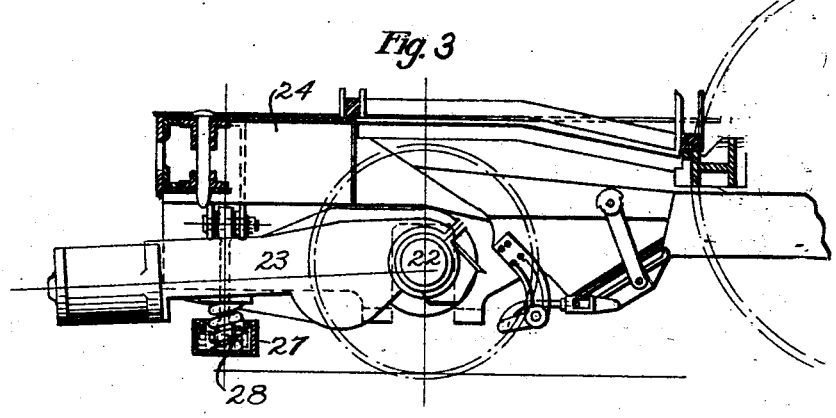
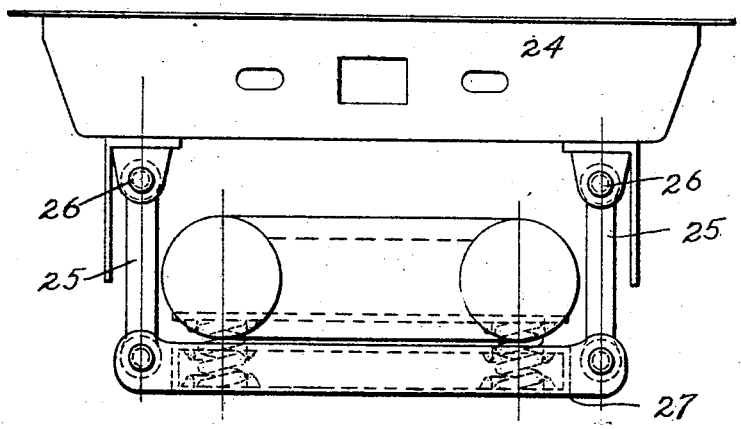
Inventor
Charles T. Westlake
By Cornwall, Bedell & Janney
Att'ys Patented July 26, 1927.

1,636,843

UNITED STATES PATENT OFFICE.

CHARLES T. WESTLAKE, OF ST. LOUIS, MISSOURI, ASSIGNOR TO COMMONWEALTH STEEL COMPANY, OF ST. LOUIS, MISSOURI, A CORPORATION OF NEW JERSEY.

BOOSTER-MOTOR SUPPORT.

Application filed July 17, 1924. Serial No. 726,553.

My invention relates to railway rolling stock and consists in an improved mounting for booster motors of the type illustrated in Ingersoll Patent, No. 1,339,395, issued May 11, 1920.

The object of my invention is to provide an improved mounting for the bed of the booster motor whereby the booster motor may be free to move with the axle to which it is connected and on which it may be mounted in part, irrespective of relative movements between the axle and other members upon which the booster motor is partly supported.

In attaining this general object I also desire to provide supports for the booster motor at spaced points and preferably provide yielding supports for the booster motor.

In the accompanying drawings illustrating my invention—

Figure 1 is a vertical longitudinal section through the center of the bed of a booster motor showing the axle upon which the booster is partly supported and showing a cross member of a locomotive structure which also supports the booster motor.

Figure 2 is a vertical cross section on line 2—2 of Figure 1.

Figure 3 is a side elevation, sectioned in part, to illustrate the application of my invention to a booster motor supporting member suspended from the main frame of the locomotive.

Figure 4 is a rear elevation of the booster motor supporting arrangement illustrated in Figure 3.

In the construction shown in Figures 1 and 2, 1 indicates the axle of a trailer truck and 2 indicates the transom or other cross member of the trailer truck parallel with and substantially spaced from axle 1. 3 indicates the bed or frame of the booster motor which includes forwardly extending arms 4 in which is journaled axle 1. Other parts of the booster motor, such as the steam supply chamber 5, the cylinders 6, axle engaging gears 7, a clutch operating cylinder 8 and toggle 9, are illustrated but form no part of my present invention except that they comprise portions of the booster motor.

The trailer truck transom 2 is shown as being box-shaped in cross section and at 10 and 11 the upper wall of the transom is provided with openings. The lower wall beneath openings 10 and 11 is recessed to form seats 12 for coil springs 13 which project upwardly through openings 10 and 11 a substantial distance above the top wall of the transom and support the booster bed 3 which is recessed to provide seats 14 opposing transom seats 12. These springs are shown as being located beneath cylinders 6 but it is obvious that other spacing of the springs may be used. The provision of the springs permits the booster bed to move upwardly away from the transom or to move downwardly toward the transom or, conversely, to permit the transom to move to and from the booster bed. Also the booster bed may tilt in a vertical plane parallel with axle 1 so as to compress one spring 13 while the other is expanded or to compress one spring 13 more than the other spring. Also the bed, as a whole, may move longitudinally or transversely of the transom to a limited extent which will be sufficient to accommodate any variation between the axle 1 and the trailer truck frame.

In the modification illustrated in Figures 3 and 4, the trailer axle is indicated at 22 and the booster motor frame at 23. The trailer axle is mounted in a pedestal formed in the locomotive frame 24 and no trailer truck frame is provided, the rear end of the booster being suspended from the locomotive frame by means of links 25 pivoted to the locomotive frame at 26 and pivotally carrying a cross beam 27. Cross beam 27 may be box-shape in cross section and provided with openings and seats for springs 28 which yieldingly support the booster frame or bed 23 similarly to the springs 13 shown in Figures 1 and 2. With this structure the entire weight of the booster is carried directly upon the trailer axle and the main frame of the locomotive but the booster is free to move with the trailer axle irrespective of the movement of the locomotive frame.

In each of the embodiments of my invention illustrated and described, the booster motor is yieldingly supported and free to move with the axle to which it is attached without substantial interference by the other member which supports the motor. Where the cross bar is used whether a part of the trailer truck frame or a bar suspended from the locomotive frame, the springs are mounted beneath the upper surface of the bar so as to obtain greater flexibility.

Obviously, the spacing of the springs and their mounting on parts of the locomotive and their engagement with the booster motor bed may be varied without departing from the spirit of my invention as expressed in the appended claims.

I claim:

1. In a locomotive, a trailer truck including an axle and a frame, a booster motor mounted on said axle and at spaced points on itself and on said frame so as to be free to move with said axle independently of movement of said frame.

2. In a locomotive, a trailer truck including an axle and a frame having a transom spaced from said axle, and a booster motor mounted on said axle and at spaced points on said transom so as to have independent limited movement to and from the latter at each of said points.

3. In a locomotive, a trailer truck including an axle and a frame having a transom spaced from said axle, and a booster motor mounted on said axle and at spaced points on said transom so as to have independent limited movement to and from the latter and transversely or longitudinally of the same at each of said points.

4. In a locomotive, a trailer truck including an axle and a frame having a transom spaced from said axle, springs carried by said transom, and a booster motor independently supported by each of said springs so as to be spaced above said transom.

5. In a locomotive, a trailer truck including an axle and a frame having a transom spaced from said axle, springs mounted on said transom below the upper face thereof, and a booster motor independently supported by each of said springs so as to be spaced above said transom.

6. In a locomotive, a trailer truck including an axle and a frame having a transom spaced from said axle and provided with recesses in its upper face, springs seated in said recesses and extending above said transom, and a booster motor independently supported on said springs.

7. In a locomotive, a trailer truck including an axle and a frame having a transom, a booster motor, said transom and motor being provided with spaced recesses, and a spring seated in each of said recesses and independently supporting said motor on said transom.

8. In a locomotive, a trailer truck including an axle and a frame having a transom, a booster motor, said transom being provided with spaced recesses opposing similar recesses provided in said motor, and springs seated in said recesses and yieldingly supporting said motor.

9. In a locomotive, a trailer truck including an axle and a frame having a transom box-shaped in cross section and provided with openings in its upper wall, spaced springs seated on the lower wall of said transom and projecting through said openings, and a booster motor supported at spaced points above said transom by said springs.

10. In a locomotive, a trailer axle and wheels, a member spaced from said axle, springs having fixed ends on said member at spaced points, and a booster motor mounted on said axle and at spaced points on said springs so as to be free to move relatively to said member in different degrees at said points.

In testimony whereof I hereunto affix my signature this 11th day of July, 1924.

CHARLES T. WESTLAKE.